United States Patent
Ren et al.

(10) Patent No.: US 10,740,912 B2
(45) Date of Patent: Aug. 11, 2020

(54) DETECTION OF HUMANS IN IMAGES USING DEPTH INFORMATION

(71) Applicant: INTEL CORPORATION, Santa Clara, CA (US)

(72) Inventors: Haibing Ren, Beijing (CN); Yimin Zhang, Beijing (CN); Fei Duan, Beijing (CN)

(73) Assignee: Intel Corporation, Santa Clara, CA (US)

( * ) Notice: Subject to any disclaimer, the term of this patent is extended or adjusted under 35 U.S.C. 154(b) by 104 days.

(21) Appl. No.: 16/094,997

(22) PCT Filed: May 19, 2016

(86) PCT No.: PCT/CN2016/082603
§ 371 (c)(1),
(2) Date: Oct. 19, 2018

(87) PCT Pub. No.: WO2017/197620
PCT Pub. Date: Nov. 23, 2017

(65) Prior Publication Data
US 2019/0156499 A1    May 23, 2019

(51) Int. Cl.
*G06T 7/50*    (2017.01)
*G06K 9/00*    (2006.01)
(Continued)

(52) U.S. Cl.
CPC .......... *G06T 7/50* (2017.01); *G06K 9/00362* (2013.01); *G06K 9/6215* (2013.01);
(Continued)

(58) Field of Classification Search
CPC ........................................ G06T 7/50
(Continued)

(56) References Cited

U.S. PATENT DOCUMENTS

| 2012/0237118 A1 | 9/2012 | Hyuga et al. |
| 2014/0241617 A1 | 8/2014 | Shotton et al. |
| 2016/0086017 A1 | 3/2016 | Rodriguez et al. |

FOREIGN PATENT DOCUMENTS

| CN | 103608841 | 2/2014 |
| CN | 104025118 | 9/2014 |

(Continued)

OTHER PUBLICATIONS

International Search Report for International Application No. PCT/CN2016/082603, dated Feb. 22, 2017, 4 pages.

(Continued)

*Primary Examiner* — Stephen P Coleman
(74) *Attorney, Agent, or Firm* — Finch & Maloney PLLC

(57) ABSTRACT

Techniques are provided for detection of humans in images that include depth information. A methodology embodying the techniques includes segmenting an image into multiple windows and estimating the distance to a subject in each window based on depth pixel values in that window, and filtering to reject windows with sizes that are outside of a desired window size range. The desired window size range is based on the estimated subject distance and the focal length of the depth camera that produced the image. The method further includes generating classifier features for each remaining windows (post-filtering) for use by a cascade classifier. The cascade classifier creates candidate windows for further consideration based on a preliminary detection of a human in any of the remaining windows. The method further includes merging neighboring candidate windows and executing a linear classifier on the merged candidate windows to verify the detection of a human.

20 Claims, 10 Drawing Sheets

(51) Int. Cl.
*G06T 7/10* (2017.01)
*G06K 9/62* (2006.01)

(52) U.S. Cl.
CPC ......... *G06K 9/6256* (2013.01); *G06K 9/6279* (2013.01); *G06T 7/10* (2017.01); *G06K 9/00201* (2013.01)

(58) Field of Classification Search
USPC ........................................................ 382/103
See application file for complete search history.

(56) References Cited

FOREIGN PATENT DOCUMENTS

| EP | 2893491 | 7/2015 |
| WO | 2016/045711 | 3/2016 |
| WO | 2017/197620 | 11/2017 |
| WO | 2017/206144 | 12/2017 |

OTHER PUBLICATIONS

Written Opinion of the International Searching Authority for International Application No. PCT/CN2016/082603, dated Feb. 22, 2017, 4 pages.
International Preliminary Report on Patentabilty for International Application No. PCT/CN2016/082603, dated Nov. 29, 2018, 6 pages.
Hu et al., "Robust Head-shoulder Detection Using a Two-Stage Cascade Framework", 2014 22nd International Conference on Pattern Recognition, IEEE Computer Society, pp. 2796-2801 (2014).
Tian et al., "Pedestrian Detection aided by Deep Learning Semantic Tasks", arXiv:1412.0069v1, 14 pages (Nov. 29, 2014).
Ouyang et al., "DeepID-Net: Deformable Deep Convolutional Neural Networks for Object Detection", CVPR2015, pp. 2403-2412 (2015).
Munaro et al., "Fast RGB-D People Tracking for Service Robots", Autonomous Robots, 15 pages (2014).
International Search Report for International Application No. PCT/CN2016/084512, dated Feb. 20, 2017, 5 pages.
Written Opinion of the International Searching Authority for International Application No. PCT/CN2016/084512, dated Feb. 20, 2017, 4 pages.
International Preliminary Report on Patentabilty for International Application No. PCT/CN2016/084512, dated Dec. 13, 2018, 5 pages.
Baltieri et al., "People Orientation Recognition by Mixtures of Wrapped Distributions on Random Trees",ECCV 2012, pp. 270-283 (2012).
Fanelli et al., "Real Time Head Pose Estimation with Random Regression Forests", IEEE Conference on Computer Vision and Pattern Recognition (CVPR'11), pp. 617-624 (2011).
Strupczewski et al., "Head Pose Tracking from RGBD Sensor Based on Direct Motion Estimation", Pattern Recognition and Machine Intelligence, vol. 9124, pp. 202-212 (2015).

DETECTION OF HUMANS IN IMAGES USING DEPTH INFORMATION

BACKGROUND

Detection of the presence of a human in an image is often useful, for example in surveillance applications, robotic applications, or as a preliminary operation in an image processing system. Unfortunately, automated human image detection is a relatively difficult computational problem due to the wide variations that are possible between images of different people. These variations may be related to general physical appearance, clothing, position and pose, illumination, and viewing angle, to name a few. Existing methods for human detection are typically limited to certain situations or scenarios that include, for example, a particular viewing angle, or the requirement that the person be in a specific pose with respect to the camera. These methods also tend to be computationally expensive, requiring large training databases and relatively fast processors. Even so, these methods tend not to be robust, resulting in unacceptable rates of false alarm and missed detections.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Figure 1:
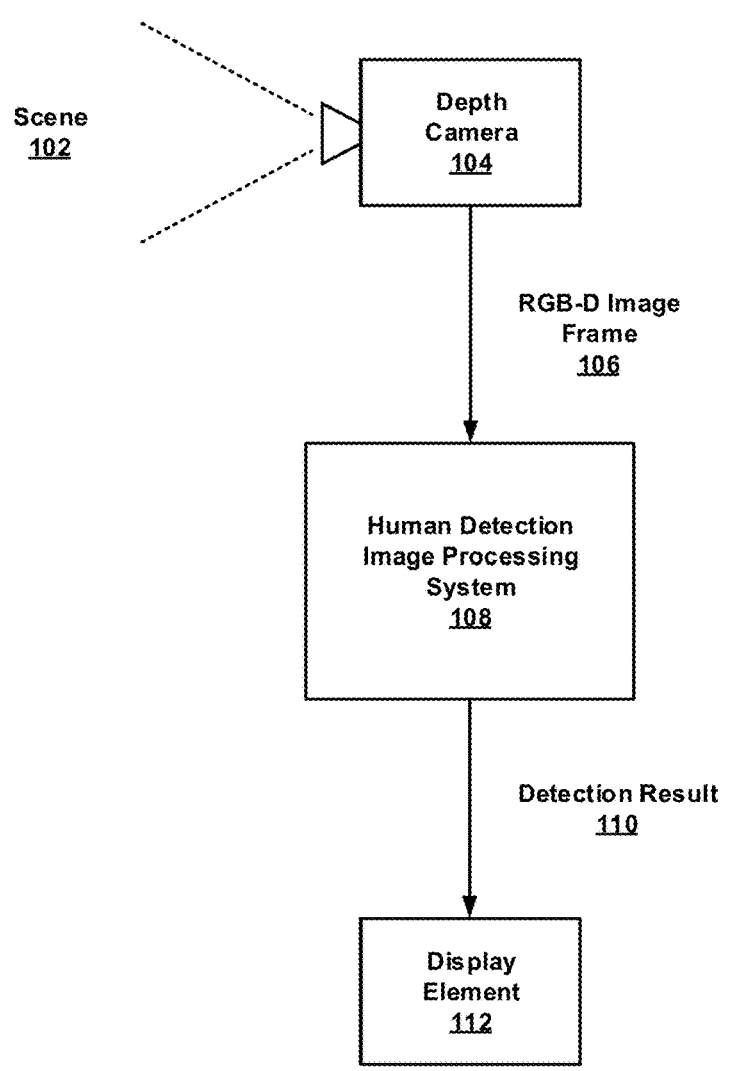
FIG. 1 is a top level block diagram of an implementation of a human detection image processing system, configured in accordance with certain of the embodiments disclosed herein.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for improved detection of humans in images that include depth information. Such images may be generated, for example, by a depth camera that provides both color (red-green-blue or RGB) pixels and depth pixels. Such images may be referred to as RGBD images. The techniques described herein may detect or recognize the presence of a human body in an image viewed from any angle (e.g., 360 degrees) and any pose (e.g., standing, sitting, etc.), according to some embodiments. The techniques may also provide for generally increased detection accuracy with reduced false alarm rate, compared to existing methods that do not exploit depth information, as will be appreciated in light of this disclosure. Additionally, in some embodiments, the detection may be based on images that capture only the upper portion of a human body, or otherwise is based on the upper body portion or other targeted body portion captured in a given image such that non-target body portions captured in the image are ignored.

In accordance with an embodiment, techniques for human detection may include segmenting an RGBD image into a relatively large number of windows of varying size and degree of overlap. In some embodiments, there may be something on the order of millions of such segmented windows. In each window, the distance to a subject may be estimated based on an average of depth pixel values. A filtering operation may then be performed to reject windows having sizes that fall outside of a desired window size range that is matched to an expected size for a human body (or portion thereof) at a given distance. This filtering operation may thus reduce the number of windows subject to further consideration and processing in a relatively efficient manner. The desired window size range is based on the estimated subject distance and the focal length of the camera that produced the image. Classifier features may then be generated for each of the filtered windows for use by a cascade classifier. The cascade classifier is configured to create candidate windows for further consideration based on a preliminary detection of a human in any of the filtered windows. Neighboring candidate windows may then be merged and provided to a linear classifier to verify the human detection, based on additional features related to context surrounding the candidate windows.

The techniques described herein may allow for reduced computational overhead, including reduced classifier training, compared to existing methods, given the window-based focus on the targeted body portion. Additionally, these techniques do not require special camera calibration procedures and can be implemented in any desired platform including, for example, a mobile device such as a tablet or smartphone that includes a depth camera or can receive images from a depth camera. These techniques may further be implemented in hardware or software or a combination thereof.

FIG. 1 is a top level block diagram 100 of an implementation of a human detection image processing system, configured in accordance with certain of the embodiments disclosed herein. A depth camera 104 is configured to generate RGBD image frames 106 of a scene 102. The scene may encompass any subject matter and may or may not include people. One or more RGBD image frames 106 are provided to the human detection image processing system 108, the operations of which will be described in greater detail below, and detection results 110 are generated. The detection results may be presented to a user or operator of the system through a display element 112 or other suitable mechanism.

Figure 2:
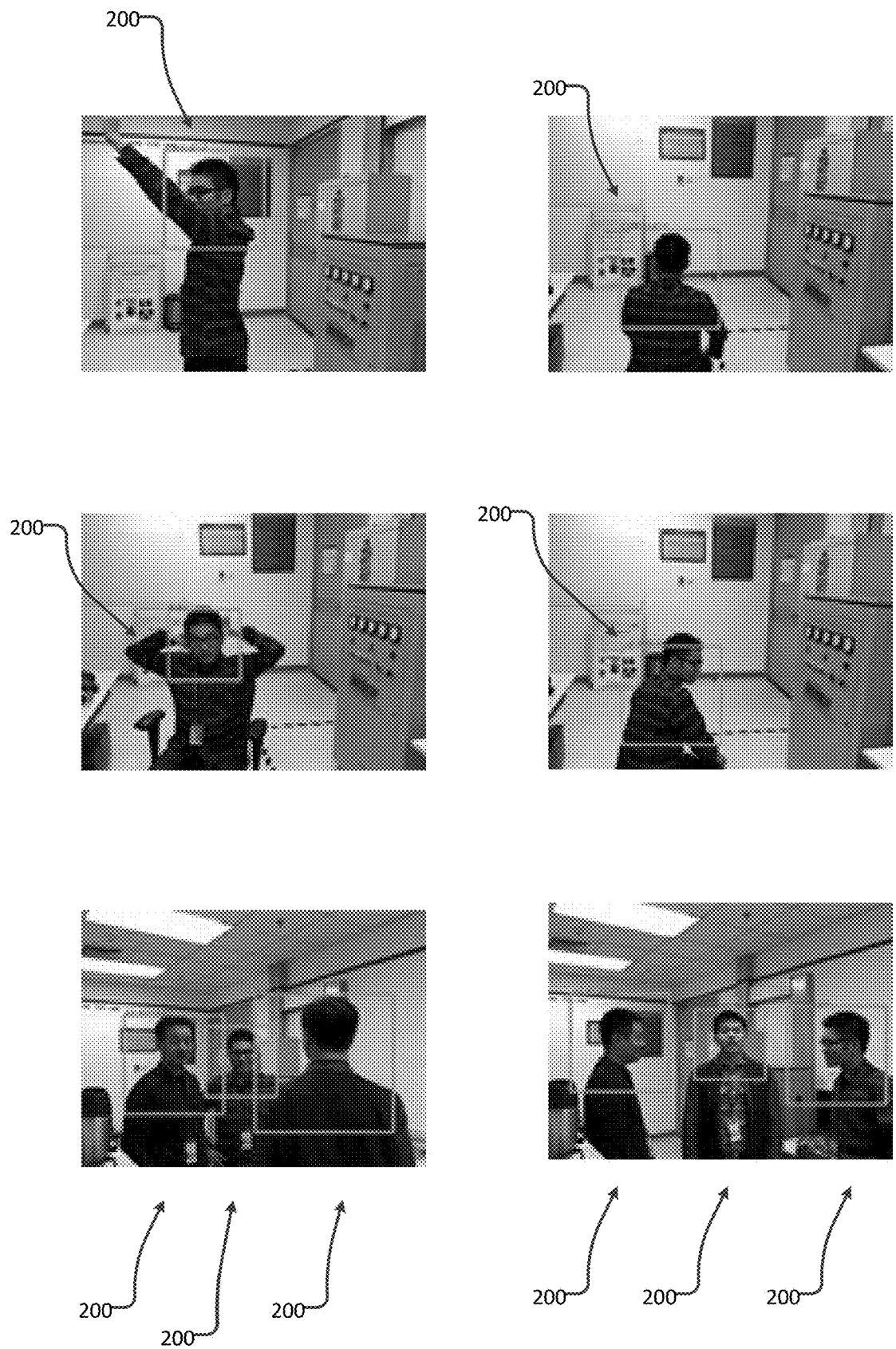
FIG. 2 illustrates examples of human detection in images, in accordance with certain of the embodiments disclosed herein.

FIG. 2 illustrates examples of human detection in images, in accordance with certain of the embodiments disclosed herein. Each example image shown in this figure may correspond to the RGB component of one of the RGBD image frames 106 provided to the detection system 108. Detection results show that one or more people are detected in each image, as indicated by the windows 200 designated with green squares. The detections are based on image processing techniques applied, in some cases, to just a portion of a human body (e.g., an upper portion that includes the head), as will be explained in greater detail below. Moreover, as can be seen in this figure, humans are detected from varying view angles (e.g., front, side, and back) and varying poses (standing, sitting, arms raised, and arms behind the head).

Figure 3:
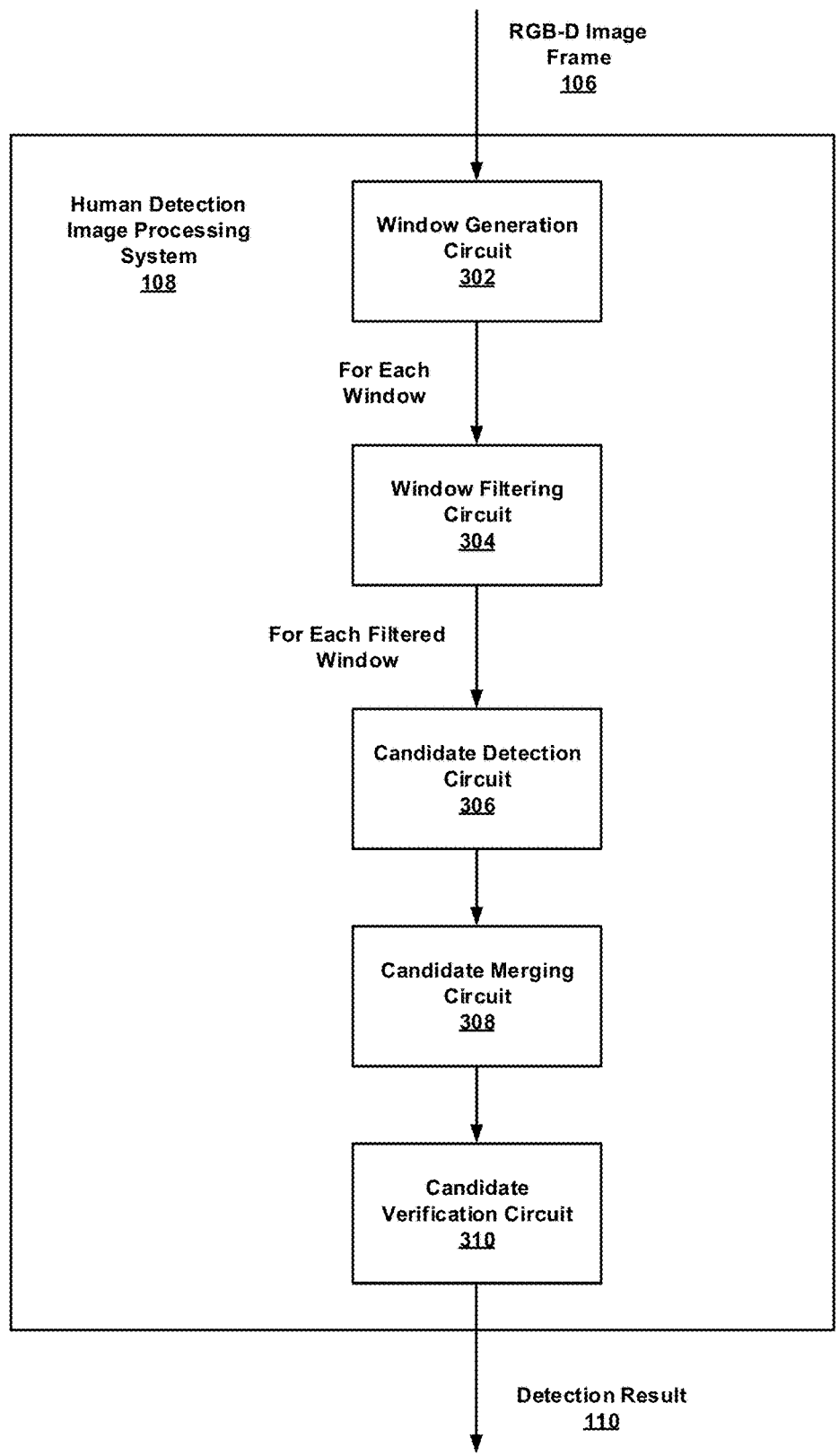
FIG. 3 is a top level block diagram of a human detection image processing system, configured in accordance with certain of the embodiments disclosed herein.

FIG. 3 is a top level block diagram of a human detection image processing system 108, configured in accordance with certain of the embodiments disclosed herein. The disclosed techniques include segmentation of an RGBD image into a relatively large number of windows and checking each window to determine the presence or absence of an upper-body portion of a human. At a top level, the techniques can be grouped into three stages: window filtering, candidate detection based on information interior to the window, and candidate verification based on window context. Each stage may reject some windows to improve processing performance in the following stage. Windows that survive through all three of the stages may be considered as positive detection results, which is to say that they include a human. As there can be millions of windows requiring analysis, the window filtering stage is configured to perform the first stage of rejection of non-human-containing windows with relatively minimal computation.

In more detail, then, the human detection image processing system is shown to include a window generation circuit 302, a window filtering circuit 304, a candidate detection circuit 306, a candidate merging circuit 308, and a candidate verification circuit 310.

The window generation circuit 302 may be configured to segment an RGBD image into a number of windows of varying size, position, and degree of overlap. In some embodiments the windows may be square (e.g., the width and height being substantially equal), to reduce the number of possible window geometries for consideration. In some embodiments, the position of each window may be shifted, relative to a neighboring window, by 5 to 10 percent of the window width in the vertical and/or the horizontal direction. In some embodiments, the window sizes may range from a minimum selected size up to the size of the entire image in scale factor steps of approximately 1.2 to 1.4. So, for example, with a scale factor step of 1.4 and a minimum window size of 100×100 pixels, the window sizes would be 100×100, 140×140, 196×196, 275×275, 384×384, . . . , up to the full size of the image.

The window filtering circuit 304 may be configured to estimate the distance to a subject in each of the windows based on the value of the depth pixels in the window and to filter those windows to reject windows having a size that falls outside of a desired window size range. The collective output of circuit 304 is thus a target set of windows, which is a subset of all windows generated by circuit 302. The desired window size range may be based on the estimated subject distance and on the focal length of the depth camera, as will be described below.

The candidate detection circuit 306 may be configured to generate classifier features for each of the windows that survive filtering and to apply a cascade classifier to those windows to create a smaller set of candidate windows based on those generated features. In other words, the cascade classifier may be configured to perform preliminary detection of a human in each of the filtered windows using information that is contained in the window.

The candidate merging circuit 308 may be configured to merge neighboring candidate windows to further reduce the set of candidate windows. The candidate verification circuit 310 may be configured to execute a linear classifier on the merged candidate windows to verify the human detection. The linear classifier may be configured to use additional context information, from regions of the image that surround the merged candidate windows, as will also be explained below. This context information may allow for the use of a reduced complexity linear classifier (e.g., reduced training and reduced computation time), while maintaining a level of accuracy and false alarm rate provided by more complex classifiers used in traditional approaches.

Figure 4:
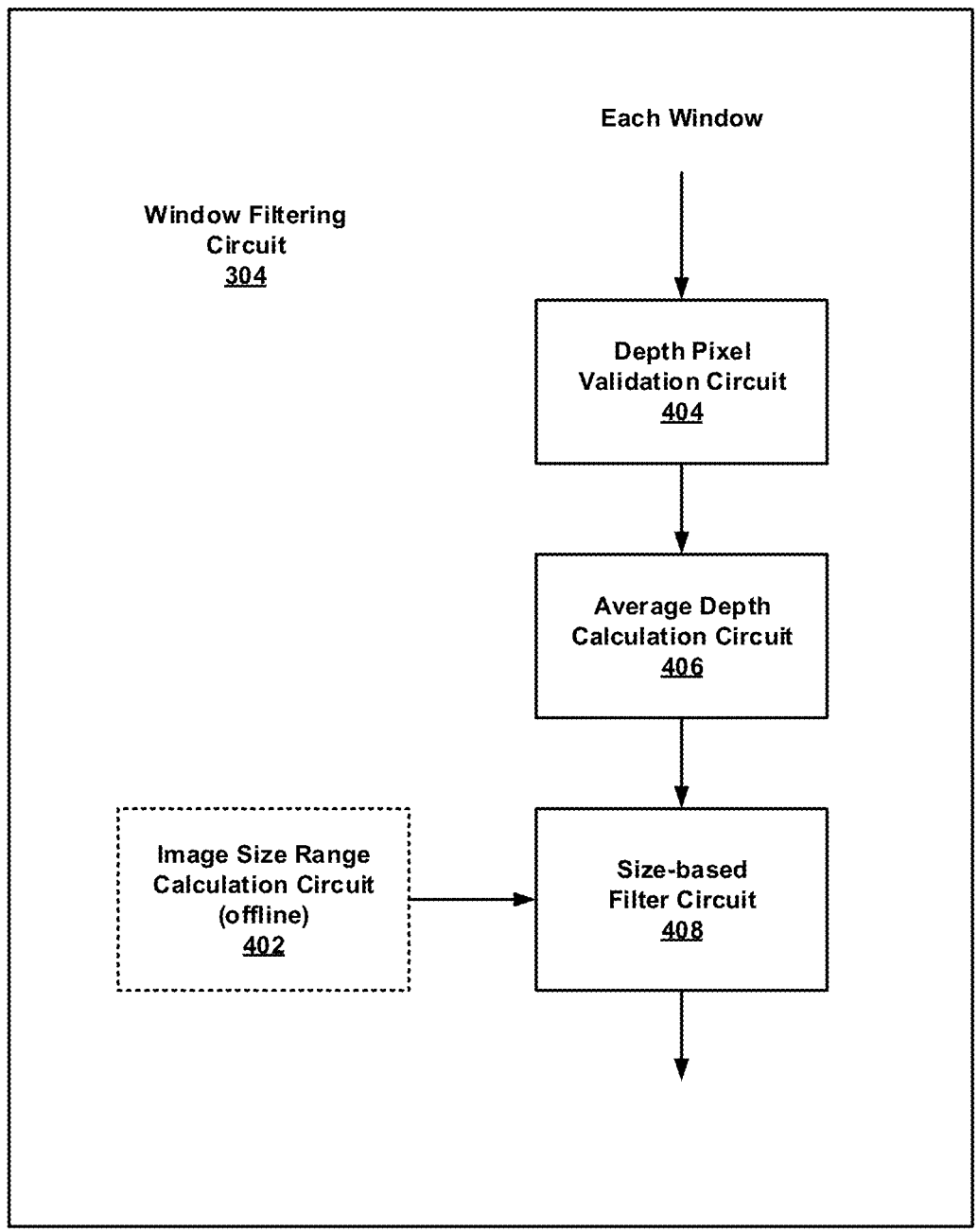
FIG. 4 is a more detailed block diagram of a window filtering circuit, configured in accordance with certain of the embodiments disclosed herein.

FIG. 4 is a more detailed block diagram of a window filtering circuit 304, configured in accordance with certain of the embodiments disclosed herein. The window filtering circuit is shown to include a depth pixel validation circuit 404, an average depth calculation circuit 406, and a size-based filter circuit 408. Additionally, an image size range calculation circuit 402 may be provided which, in some embodiments, may be run in an offline mode, for example prior to the detection operations.

Figure 5:
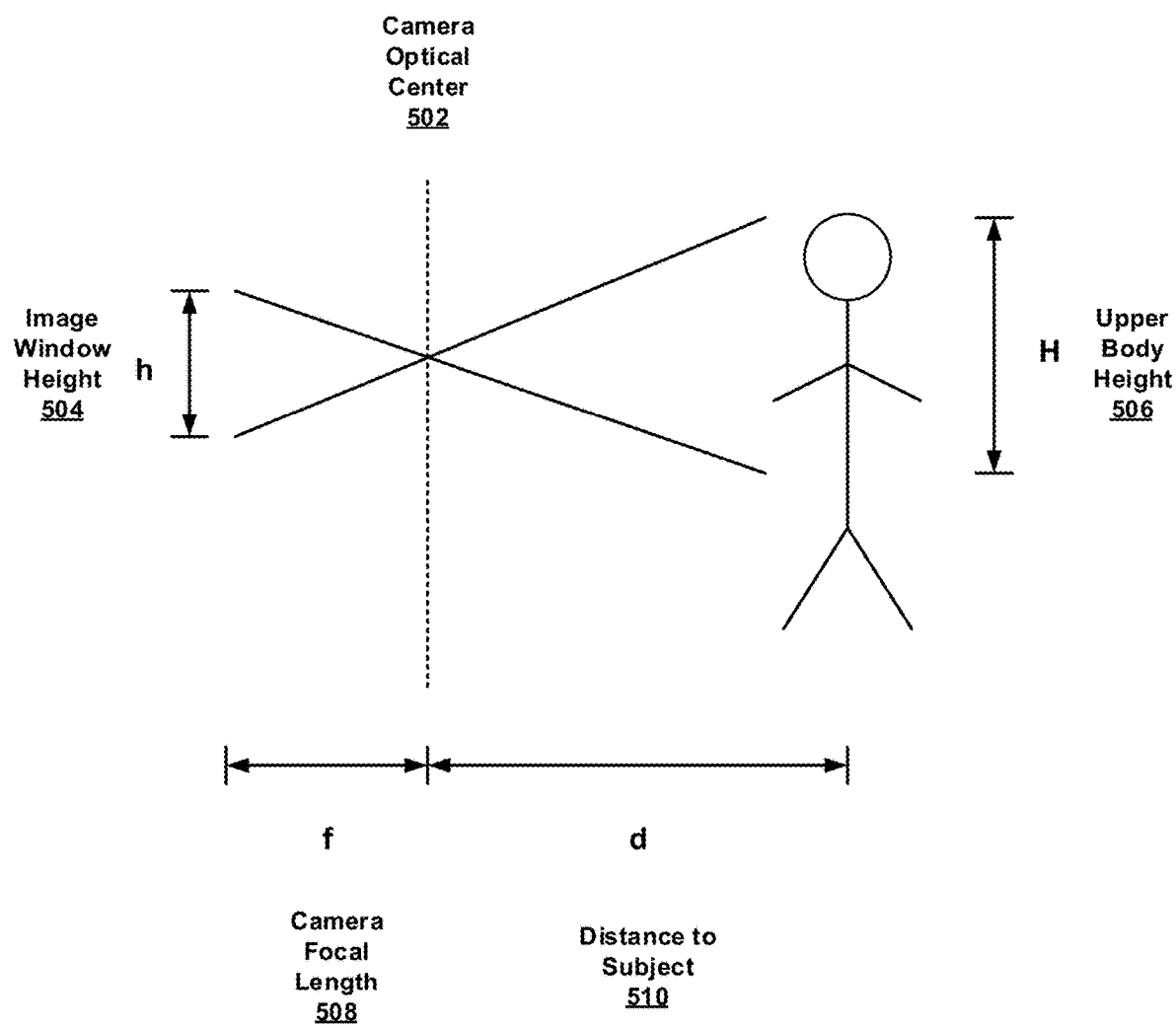
FIG. 5 illustrates image window size calculations, in accordance with certain of the embodiments disclosed herein.

The image size range calculation circuit 402 may be configured to precompute a set of desired window size ranges for each of a number of allowable or expected subject distances. This is illustrated in greater detail in FIG. 5 which shows a person with upper body height H 506, at a distance d 510 from the depth camera's optical center 502. In some embodiments, it may be assumed that realistic human heights lie in the range of 1.0 to 2.5 meters, although other values may be used, as appropriate. Based on this assumption, the upper body height H may be estimated in the range of 0.3 to 0.8 meters. Additionally, the camera's focal length f 508 is typically known or can be readily measured prior to implementation of the system. Thus, for any given set of values of H, d, and f an image window height h 504 can be computed according to the formula: $h=(H/d)*f$. Typically, a range of distances, d, of interest can be pre-determined. Thus, the set of desired window sizes, corresponding to each selectable increment of distance within that distance range of interest, may be pre-computed as an offline operation to reduce processing workload during real-time detection. These desired window sizes are based on the image window height h 504, for example h×h, although other geometries are possible. An image size range may be selected to range from a minimum value to a maximum value around the desired window size, for example +/−5 percent or some other suitable value. The desired window size ranges may be stored in a table, for example in memory. In some embodiments, the table may be indexed by the corresponding distance for efficient access by circuit 408 described below.

The depth pixel validation circuit 404 may be configured to validate the depth pixels of each window prior to filtering. In some embodiments, the validation may include checking that the values of the depth pixels are within an acceptable range. For instance, some depth cameras set a pixel's depth value to zero to indicate an error or problem of some sort with that pixel.

The average depth calculation circuit 406 may be configured to calculate an average of some or all of the values of the depth pixels in each window. Invalid pixels may be excluded from this calculation. This calculated average value may be representative of the distance from the camera to the subject matter in that window and thus serve as an estimated distance to the subject.

The size-based filter circuit 408 may be configured to select a window size range based on the estimated distance to the subject. For example, the estimated distance may be used to index into the table described above to retrieve the appropriate window size range for the estimated subject distance. If the size of the current window falls outside of this window size range it is rejected, since a human body (or upper portion), imaged at the estimated distance, would not be able to fit in that window. Thus, only windows that meet certain predefined criteria are output by circuit 408. As previously explained, these select windows collectively form a target set of windows, which is a subset of all windows generated by circuit 302. In some embodiments, this may reduce the detection false alarm rate by 20 to 30 percent.

Figure 6:
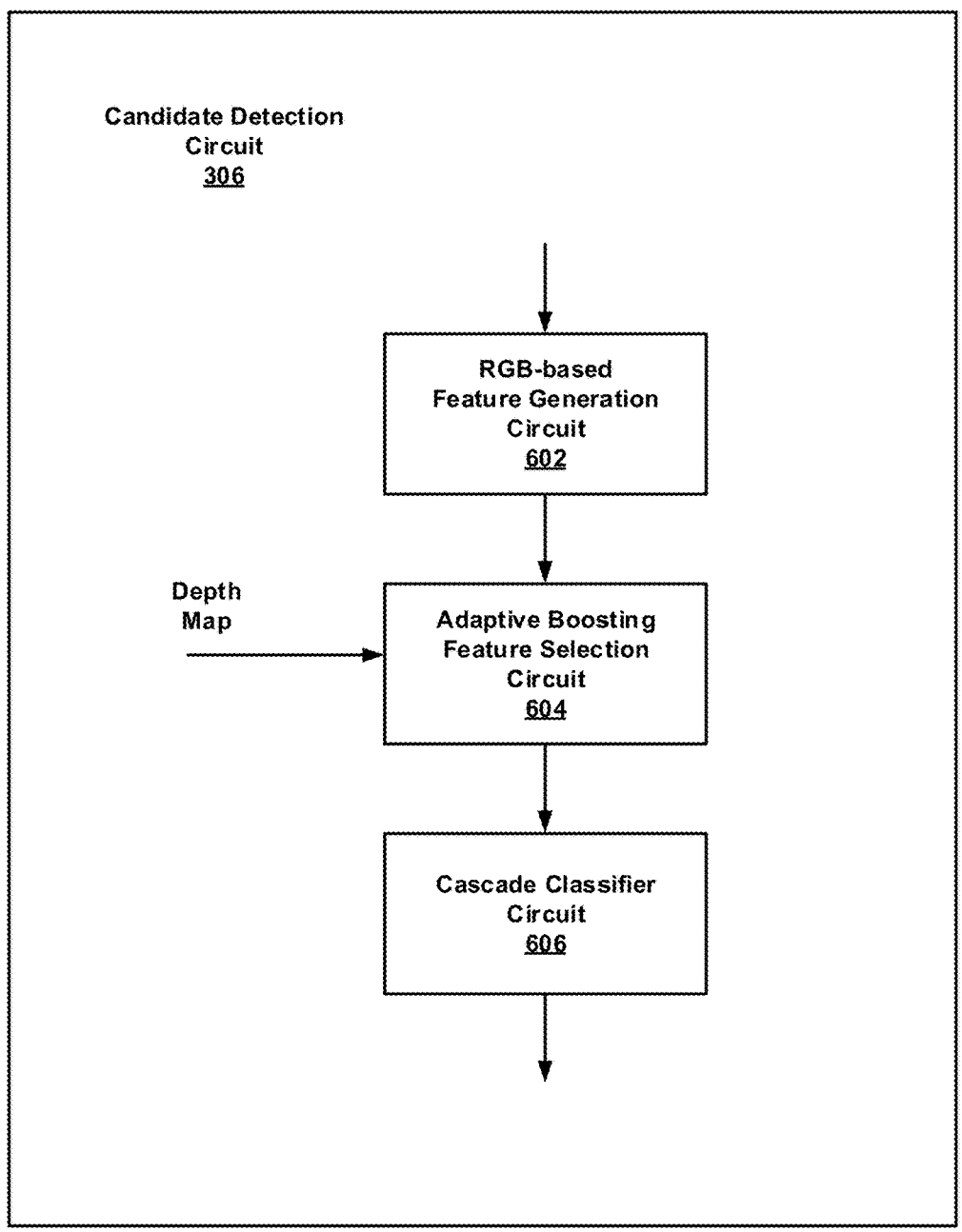
FIG. 6 is a more detailed block diagram of a candidate detection circuit, configured in accordance with certain of the embodiments disclosed herein.

FIG. 6 is a more detailed block diagram of a candidate detection circuit 306, configured in accordance with certain of the embodiments disclosed herein. The candidate detection circuit is shown to include an RGB-based feature generation circuit 602, an adaptive boosting feature selection circuit 604, and a cascade classifier circuit 606.

Figure 7:
FIG. 7 illustrates image features, in accordance with certain of the embodiments disclosed herein.
Figure 7:
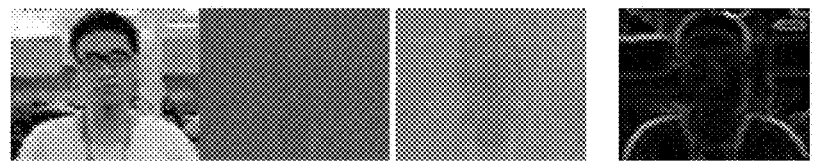
Figure 7:
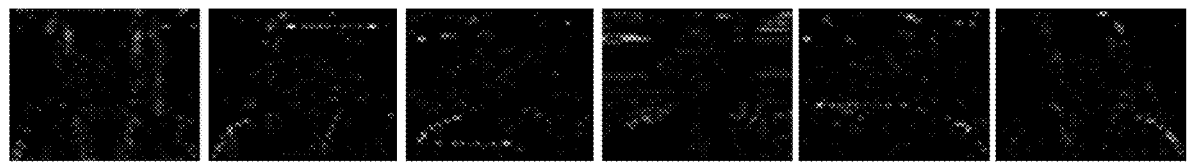
Figure 7:
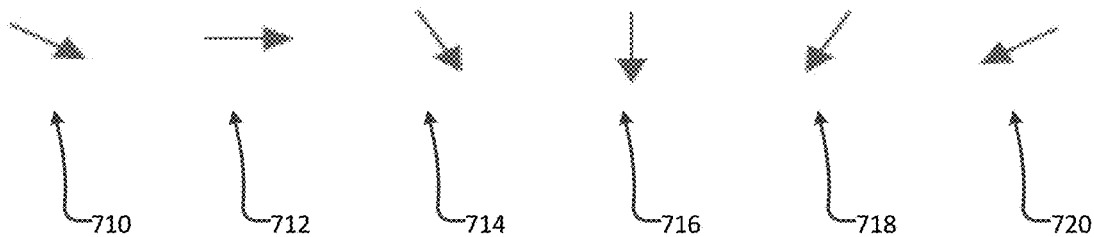

The RGB-based feature generation circuit 602 may be configured to generate classifier features from the RGB data in each of the subset of filtered windows for use by the cascade classifier circuit 606. The classifier features may include one or more of: luminance, hue, saturation, gradient, gradient orientation, and depth values, as illustrated in FIG. 7 and described below. The depth values of the window may also be added to this set of features.

The adaptive boosting feature selection circuit 604 may be configured to train the cascade classifier using known adaptive boosting techniques, in light of the present disclosure, based on some selected combination of the generated features.

The cascade classifier circuit 606 may be configured to reject non-human-containing windows, leaving remaining candidate windows for further consideration. In some embodiments, the cascade classifier may be one of a Haar classifier, a Local Binary Pattern (LBP) classifier, a Histogram of Oriented Gradients (HOG) classifier, or a Speeded-Up Robust Features (SURF) classifier. In some embodiments, other known classifier techniques may also be used, in light of the present disclosure.

FIG. 7 illustrates image features 700, in accordance with certain of the embodiments disclosed herein. Image 702 shows an example of luminance which can be used as a feature for the cascade classifier. Image 704, 706 and 708 show, respectively, examples of hue, saturation, and gradient which may also be used as a feature for the cascade classifier. Images 710 through 720 show examples of gradient orientation in various directions, as indicated by the associated red arrows, which may also be used as a feature for the cascade classifier.

Figure 8:
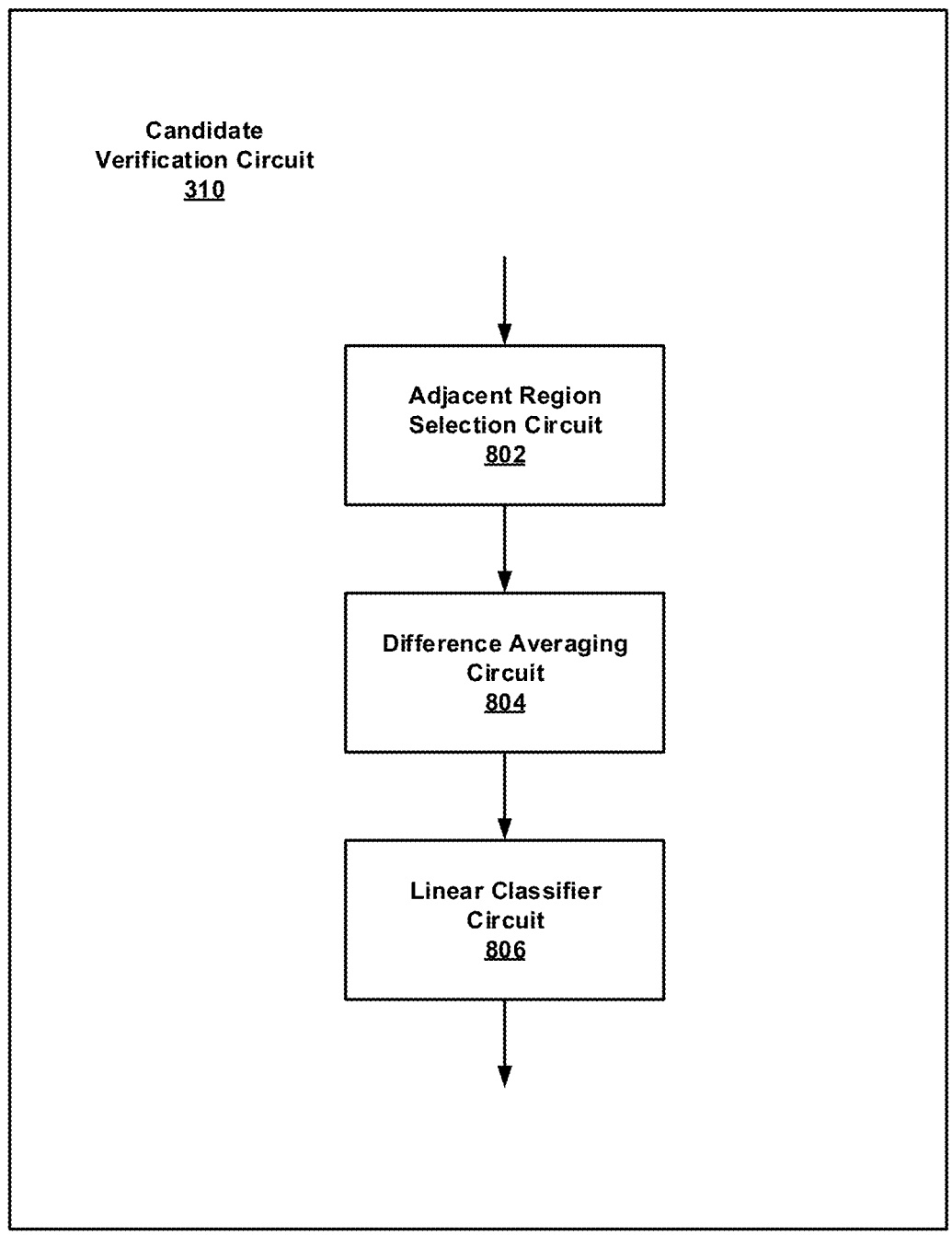
FIG. 8 is a more detailed block diagram of a candidate verification circuit, configured in accordance with certain of the embodiments disclosed herein.

FIG. 8 is a more detailed block diagram of a candidate verification circuit 310, configured in accordance with certain of the embodiments disclosed herein. The candidate verification circuit is shown to include an adjacent region selection circuit 802, a difference averaging circuit 804, and a linear classifier circuit 806.

The adjacent region selection circuit 802 may be configured to select regions adjacent to the merged candidate windows, as provided by circuit 308, to provide additional context information for the subsequent linear classifier. In some embodiments, these selected regions may be on the order of one quarter of the size of the merged candidate window.

The difference averaging circuit 804 may be configured to calculate a difference between the average of the values of the depth pixels in the adjacent regions and the average of the values of the depth pixels of the merged candidate window. This difference of averages is provided to the linear classifier as an additional feature that is associated with the context of the merged candidate window.

The linear classifier circuit 806 may be configured to use the additional context information, from the surrounding regions to simplify the complexity and training requirements of the linear classifier and to reduce false alarm rates, for improved operation. In some embodiments, the linear classifier circuit may be implemented as a Support Vector Machine (SVM) Classifier. In some embodiments, the linear classifier circuit may be implemented using other known techniques in light of the present disclosure.

Methodology

Figure 9:
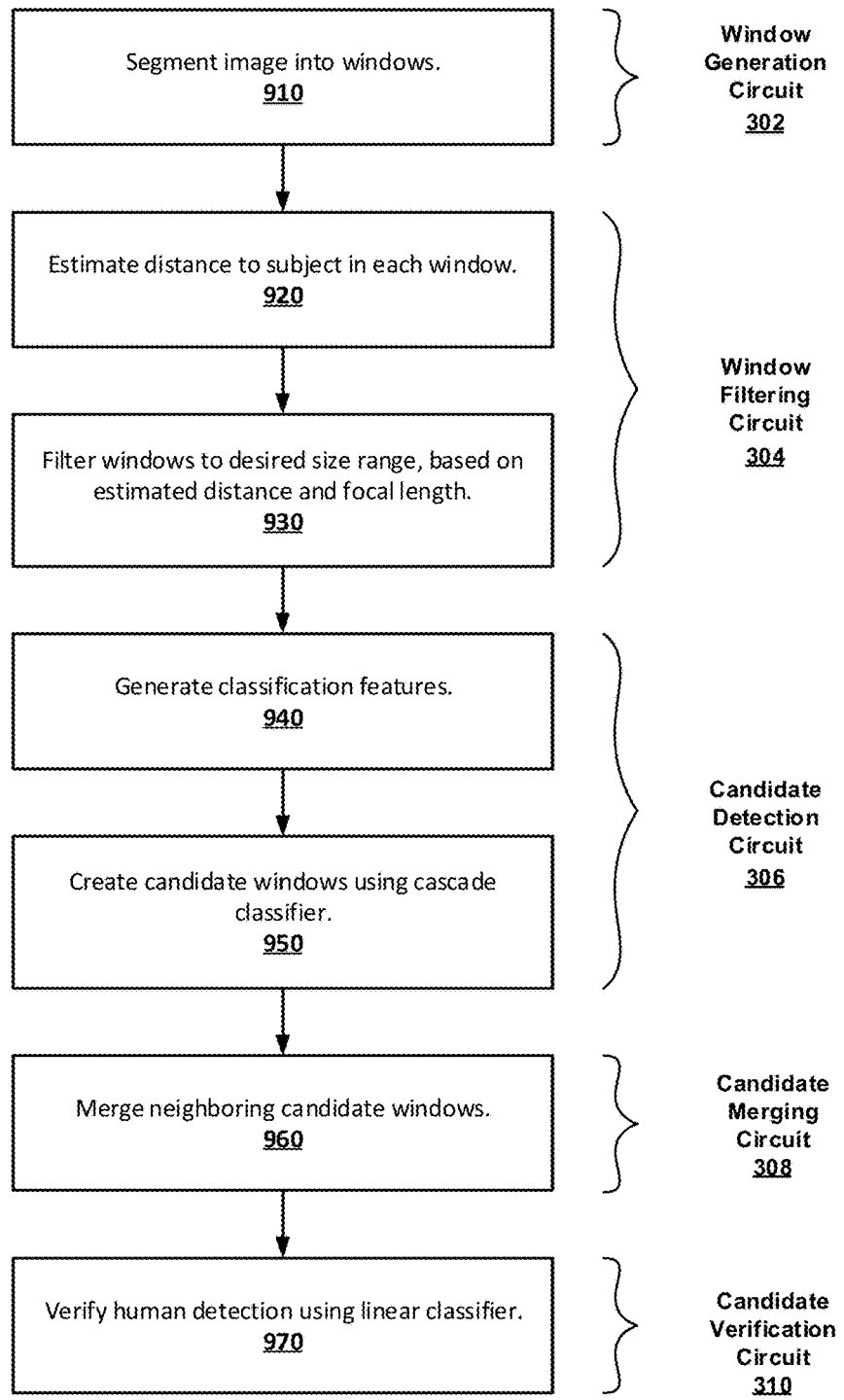
FIG. 9 is a flowchart illustrating a methodology for detection of humans in images, in accordance with certain of the embodiments disclosed herein.

FIG. 9 is a flowchart illustrating an example method 900 for detection of humans in images generated by a depth camera, in accordance with an embodiment of the present disclosure. As can be seen, example method 900 includes a number of phases and sub-processes, the sequence of which may vary from one embodiment to another. However, when considered in the aggregate, these phases and sub-processes form a process for detection of humans in accordance with certain of the embodiments disclosed herein. These embodiments can be implemented, for example using the system architecture illustrated in FIG. 3 as described above. However other system architectures can be used in other embodiments, as will be apparent in light of this disclosure. To this end, the correlation of the various functions shown in FIG. 9 to the specific components illustrated in FIG. 3 is not intended to imply any structural and/or use limitations. Rather other embodiments may include, for example, varying degrees of integration wherein multiple functionalities are effectively performed by one system. For example, in an alternative embodiment a single module can be used to perform all of the functions of method 900. Thus other embodiments may have fewer or more modules and/or sub-modules depending on the granularity of implementation. Numerous variations and alternative configurations will be apparent in light of this disclosure.

As illustrated in FIG. 9, in one embodiment, method 900 for detection of humans in images that include depth information commences by segmenting, at operation 910, the image into a number of windows. The windows may vary in size and position within the image. In some embodiments, the windows may be square (e.g., the width and height being substantially equal). The image may be provided by a depth camera such that it includes both color (e.g., RGB) pixels and depth pixels.

At operation 920, a distance to the subject in each of the windows is estimated based on the values of the depth pixels of the portion of the image in that window. In some embodiments, an average of the depth pixel values in the window may be used to estimate the subject distance.

Next, at operation 930, the windows are filtered to reject windows having sizes that are outside of a desired window size range, so as to provide a subset of the windows provided by the segmenting at operation 910. The desired window size range is selected to fit an expected size for the upper portion of a human body at a given distance. Thus, the desired window size range may be based on the estimated subject distance and the focal length of the depth camera that produced the image. In some embodiments, the desired window size ranges may be pre-computed (e.g., as an offline operation) for a range of allowable or expected subject distances.

At operation 940, classifier features are generated for each of the remaining windows post-filtering. In some embodiments, the classifier features may include luminance, hue, saturation, gradient, gradient orientation, and/or depth values. At operation 950, candidate windows are created for further consideration through execution of a cascade classifier. The cascade classifier may be configured to perform preliminary detection of a human in each of the filtered windows, based on the generated features with which it is provided. In some embodiments, the cascade classifier may be one of a Haar classifier, a Local Binary Pattern (LBP) classifier, a Histogram of Oriented Gradients (HOG) classifier, or a Speeded-Up Robust Features (SURF) classifier. The cascade classifier may be trained using known adaptive boosting techniques in light of the present disclosure.

At operation 960, neighboring candidate windows are merged and, at operation 970, a linear classifier is applied to the merged candidate windows to verify the detection of a human. In some embodiments, additional features associated with context surrounding the merged candidate windows may be provided to the linear classifier to improve classifier performance.

Example System

Figure 10:
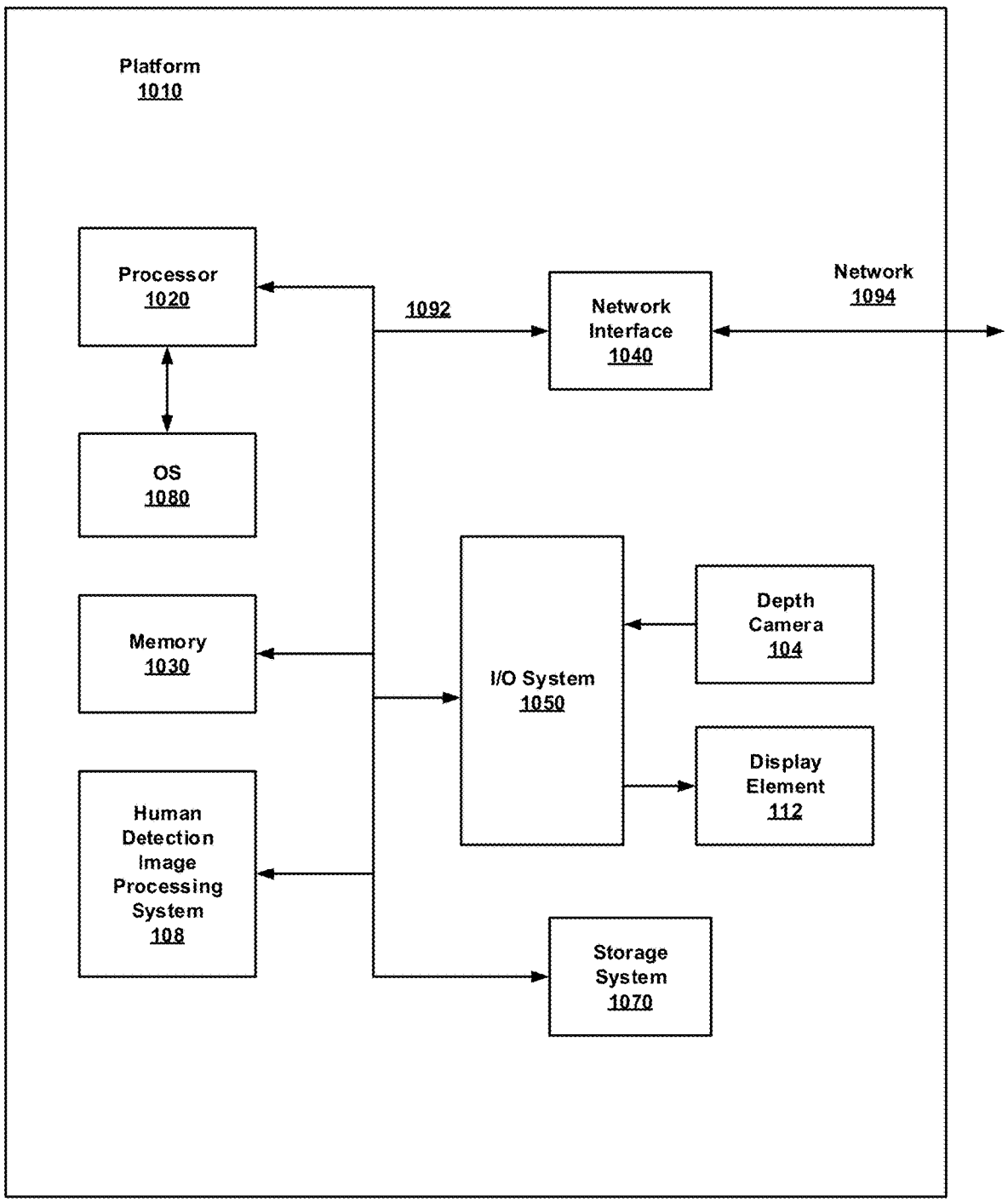
FIG. 10 is a block diagram schematically illustrating a system platform configured to perform detection of humans in images, in accordance with certain of the embodiments disclosed herein.

FIG. 10 illustrates an example system 1000 configured to perform detection of humans in images that include depth information, as described herein. In some embodiments, system 1000 comprises a platform 1010 which may host, or otherwise be incorporated into, a personal computer, workstation, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, and so forth. Any combination of different devices may be used in certain embodiments.

In some embodiments, platform 1010 may comprise any combination of a processor 1020, a memory 1030, human detection image processing system 108, a network interface 1040, an input/output (I/O) system 1050, a depth camera 104, a display element 112 and a storage system 1070. As can be further seen, a bus and/or interconnect 1092 is also provided to allow for communication between the various components listed above and/or other components not shown. Platform 1010 can be coupled to a network 1094 through network interface 1040 to allow for communications with other computing devices, platforms or resources. Other componentry and functionality not reflected in the block diagram of FIG. 10 will be apparent in light of this disclosure, and it will be appreciated that other embodiments are not limited to any particular hardware configuration.

Processor 1020 can be any suitable processor, and may include one or more coprocessors or controllers, such as an audio processor or a graphics processing unit, to assist in control and processing operations associated with system 1000. In some embodiments, the processor 1020 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 1020 may be implemented as a complex instruction set computer (CISC) or a reduced instruction set computer (RISC) processor. In some embodiments, processor 1020 may be configured as an x86 instruction set compatible processor.

Memory 1030 can be implemented using any suitable type of digital storage including, for example, flash memory and/or random access memory (RAM). In some embodiments, the memory 1030 may include various layers of memory hierarchy and/or memory caches as are known to those of skill in the art. Memory 1030 may be implemented as a volatile memory device such as, but not limited to, a RAM, dynamic RAM (DRAM), or static RAM (SRAM) device. Storage system 1070 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 1070 may comprise technology to increase the storage performance enhanced protection for valuable digital media when multiple hard drives are included.

Processor 1020 may be configured to execute an Operating System (OS) 1080 which may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with system 1000, and therefore may also be implemented using any suitable existing or subsequently-developed platform.

Network interface circuit 1040 can be any appropriate network chip or chipset which allows for wired and/or wireless connection between other components of computer system 1000 and/or network 1094, thereby enabling system 1000 to communicate with other local and/or remote computing systems, servers, and/or resources. Wired communication may conform to existing (or yet to developed) standards, such as, for example, Ethernet. Wireless communication may conform to existing (or yet to developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 1050 may be configured to interface between various I/O devices and other components of computer system 1000. I/O devices may include, but not be limited to, a depth camera 104, a display element 112, and other devices not shown such as a keyboard, mouse, microphone, speaker, etc.

I/O system 1050 may include a graphics subsystem configured to perform processing of images for display element 112. Graphics subsystem may be a graphics processing unit or a visual processing unit (VPU), for example. An analog or digital interface may be used to communicatively couple graphics subsystem and display element 112. For example, the interface may be any of a high definition multimedia interface (HDMI), DisplayPort, wireless HDMI, and/or any other suitable interface using wireless high definition compliant techniques. In some embodiment, the graphics subsystem could be integrated into processor 1020 or any chipset of platform 1010. In some embodiments, display element 112 may comprise any television type monitor or display. Display element 112 may comprise, for example, a computer display screen, touchscreen display, video monitor, television-like device, and/or a television. Display element 112 may be digital and/or analog. Under the control of the OS 1080 (or one or more software applications), platform 1010 may display images and detection results on display element 112. The images may be provided by depth camera 104 and the detection results may be provided by human detection image processing system 108, as described herein.

It will be appreciated that in some embodiments, the various components of the system 100 may be combined or integrated in a system-on-a-chip (SoC) architecture. In some embodiments, the components may be hardware components, firmware components, software components or any suitable combination of hardware, firmware or software.

Human detection image processing system 108 is configured to detect the presence of humans in images. The images may be provided by depth camera 104. Human detection image processing system 108 may include any or all of the components illustrated in FIGS. 3, 4, 6 and 8 and described above. Human detection image processing system 108 can be implemented or otherwise used in conjunction with a variety of suitable software and/or hardware that is coupled to or that otherwise forms a part of platform 1010. System 108 can additionally or alternatively be implemented or otherwise used in conjunction with user I/O devices that are capable of providing information to, and receiving information and commands from, a user. These I/O devices may include display element 112, a textual input device such as a keyboard, and a pointer-based input device such as a mouse. Other input/output devices that may be used in other embodiments include a touchscreen, a touchpad, a speaker, and/or a microphone. Still other input/output devices can be used in other embodiments.

In some embodiments, human detection image processing system 108 may be installed local to system 1000, as shown in the example embodiment of FIG. 10. Alternatively, system 1000 can be implemented in a client-server arrangement wherein at least some functionality associated with these circuits is provided to system 1000 using an applet, such as a JavaScript applet, or other downloadable module. Such a remotely accessible module or sub-module can be provisioned in real-time, in response to a request from a client computing system for access to a given server having resources that are of interest to the user of the client computing system. In such embodiments the server can be local to network 1094 or remotely coupled to network 1094 by one or more other networks and/or communication channels. In some cases access to resources on a given network or computing system may require credentials such as usernames, passwords, and/or compliance with any other suitable security mechanism.

In various embodiments, system 1000 may be implemented as a wireless system, a wired system, or a combination of both. When implemented as a wireless system, system 1000 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 1000 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the human detection methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 1094. In other embodiments the functionalities disclosed herein can be incorporated into other software applications, such as video editing applications, video analysis applications, video surveillance applications, or other content generation, modification, and/or management applications. The computer software applications disclosed herein may include any number of different modules, submodules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 1000 may comprise additional, fewer, or alternative subcomponents as compared to those included in the example embodiment of FIG. 10.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a method for detection of humans in images generated by a depth camera. The method includes: segmenting an image into a plurality of windows; estimating distance to a subject in each of the plurality of windows, based on depth pixels of the image in the window; filtering the plurality of windows to reject windows outside of a desired window size range thereby defining a target set of windows, the desired window size range based on the estimated subject distance and on a focal length of the depth camera; generating classifier features for each of the windows in the target set; creating candidate windows through execution of a cascade classifier, the cascade classifier to perform preliminary detection of a human in each of the windows in the target set, based on the generated features; merging neighboring candidate windows; and executing a linear classifier on the merged candidate windows to verify the detection of a human.

Example 2 includes the subject matter of Example 1, wherein the windows are square and vary through a range of sizes and positions within the image.

Example 3 includes the subject matter of Examples 1 or 2, further comprising validating the depth pixels used in the distance estimation.

Example 4 includes the subject matter of any of Examples 1-3, further comprising precomputing a plurality of desired window size ranges for each of a plurality of allowable subject distances.

Example 5 includes the subject matter of any of Examples 1-4, wherein the classifier features comprise one or more of: luminance, hue, saturation, gradient, gradient orientation, and depth values.

Example 6 includes the subject matter of any of Examples 1-5, wherein the cascade classifier is one of a Haar classifier, a Local Binary Pattern (LBP) classifier, a Histogram of Oriented Gradients (HOG) classifier, or a Speeded-Up Robust Features (SURF) classifier.

Example 7 includes the subject matter of any of Examples 1-6, further comprising training the cascade classifier using adaptive boosting.

Example 8 includes the subject matter of any of Examples 1-7, further comprising: selecting regions adjacent to at least one of the merged candidate windows; calculating a difference between the average of the values of the depth pixels in the adjacent regions and the average of the values of the depth pixels of the merged candidate window; and providing the difference to the linear classifier as an additional feature associated with context of the merged candidate window.

Example 9 is a system for detection of humans in images generated by a depth camera. The system includes a window generation circuit to segment an image into a plurality of windows. The system also includes a window filtering circuit to: estimate distance to a subject in each of the plurality of windows, based on depth pixels of the image in the window; and filter the plurality of windows to reject windows outside of a desired window size range thereby defining a target set of windows, the desired window size range based on the estimated subject distance and on a focal length of the depth camera. The system further includes a candidate detection circuit to: generate classifier features for each of the windows in the target set; and create candidate windows through execution of a cascade classifier, the cascade classifier to perform preliminary detection of a human in each of the windows in the target set, based on the generated features. The system further includes a candidate merging circuit to merge neighboring candidate windows; and a candidate verification circuit to execute a linear classifier on the merged candidate windows to verify the detection of a human.

Example 10 includes the subject matter of Example 9, wherein the windows are square and vary through a range of sizes and positions within the image.

Example 11 includes the subject matter of Examples 9 or 10, wherein the window filtering circuit further comprises a depth pixel validation circuit to validate the depth pixels used in the distance estimation.

Example 12 includes the subject matter of any of Examples 9-11, wherein the window filtering circuit further comprises an image size range calculation circuit to pre-compute a plurality of desired window size ranges for each of a plurality of allowable subject distances.

Example 13 includes the subject matter of any of Examples 9-12, wherein the classifier features comprise one or more of: luminance, hue, saturation, gradient, gradient orientation, and depth values.

Example 14 includes the subject matter of any of Examples 9-13, wherein the cascade classifier is one of a Haar classifier, a Local Binary Pattern (LBP) classifier, a Histogram of Oriented Gradients (HOG) classifier, or a Speeded-Up Robust Features (SURF) classifier.

Example 15 includes the subject matter of any of Examples 9-14, wherein the candidate detection circuit further comprises an adaptive boosting feature selection circuit to train the cascade classifier using adaptive boosting.

Example 16 includes the subject matter of any of Examples 9-15, wherein the candidate verification circuit further comprises: an adjacent region selection circuit to select regions adjacent to at least one of the merged candidate windows; a difference averaging circuit to calculate a difference between the average of the values of the depth pixels in the adjacent regions and the average of the values of the depth pixels of the merged candidate window; and to provide the difference to the linear classifier as an additional feature associated with context of the merged candidate window.

Example 17 is at least one non-transitory computer readable storage medium having instructions encoded thereon that, when executed by one or more processors, result in the following operations for detection of humans in images generated by a depth camera. The operations comprise: segmenting an image into a plurality of windows; estimating distance to a subject in each of the plurality of windows, based on depth pixels of the image in the window; filtering the plurality of windows to reject windows outside of a desired window size range thereby defining a target set of windows, the desired window size range based on the estimated subject distance and on a focal length of the depth camera; generating classifier features for each of the windows in the target set; creating candidate windows through execution of a cascade classifier, the cascade classifier to perform preliminary detection of a human in each of the windows in the target set, based on the generated features; merging neighboring candidate windows; and executing a linear classifier on the merged candidate windows to verify the detection of a human.

Example 18 includes the subject matter of Example 17, wherein the windows are square and vary through a range of sizes and positions within the image.

Example 19 includes the subject matter of Examples 17 or 18, the operations further comprising validating the depth pixels used in the distance estimation.

Example 20 includes the subject matter of any of Examples 17-19, the operations further comprising precomputing a plurality of desired window size ranges for each of a plurality of allowable subject distances.

Example 21 includes the subject matter of any of Examples 17-20, wherein the classifier features comprise one or more of: luminance, hue, saturation, gradient, gradient orientation, and depth values.

Example 22 includes the subject matter of any of Examples 17-21, wherein the cascade classifier is one of a Haar classifier, a Local Binary Pattern (LBP) classifier, a Histogram of Oriented Gradients (HOG) classifier, or a Speeded-Up Robust Features (SURF) classifier.

Example 23 includes the subject matter of any of Examples 17-22, the operations further comprising training the cascade classifier using adaptive boosting.

Example 24 includes the subject matter of any of Examples 17-23, the operations further comprising: selecting regions adjacent to at least one of the merged candidate windows; calculating a difference between the average of the values of the depth pixels in the adjacent regions and the average of the values of the depth pixels of the merged candidate window; and providing the difference to the linear classifier as an additional feature associated with context of the merged candidate window.

Example 25 is a system for detection of humans in images generated by a depth camera. The system comprises: means for segmenting an image into a plurality of windows; means for estimating distance to a subject in each of the plurality of windows, based on depth pixels of the image in the window; means for filtering the plurality of windows to reject windows outside of a desired window size range thereby defining a target set of windows, the desired window size range based on the estimated subject distance and on a focal length of the depth camera; means for generating classifier features for each of the windows in the target set; means for creating candidate windows through execution of a cascade classifier, the cascade classifier to perform preliminary detection of a human in each of the windows in the target set, based on the generated features; means for merging neighboring candidate windows; and means for executing a linear classifier on the merged candidate windows to verify the detection of a human.

Example 26 includes the subject matter of Example 25, wherein the windows are square and vary through a range of sizes and positions within the image.

Example 27 includes the subject matter of Examples 25 or 26, further comprising means for validating the depth pixels used in the distance estimation.

Example 28 includes the subject matter of any of Examples 25-27, further comprising means for precomputing a plurality of desired window size ranges for each of a plurality of allowable subject distances.

Example 29 includes the subject matter of any of Examples 25-28, wherein the classifier features comprise one or more of: luminance, hue, saturation, gradient, gradient orientation, and depth values.

Example 30 includes the subject matter of any of Examples 25-29, wherein the cascade classifier is one of a Haar classifier, a Local Binary Pattern (LBP) classifier, a Histogram of Oriented Gradients (HOG) classifier, or a Speeded-Up Robust Features (SURF) classifier.

Example 31 includes the subject matter of any of Examples 25-30, further comprising means for training the cascade classifier using adaptive boosting.

Example 32 includes the subject matter of any of Examples 25-31, further comprising: means for selecting regions adjacent to at least one of the merged candidate windows; means for calculating a difference between the average of the values of the depth pixels in the adjacent regions and the average of the values of the depth pixels of the merged candidate window; and means for providing the difference to the linear classifier as an additional feature associated with context of the merged candidate window.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for detection of humans in images generated by a depth camera, the method comprising:

segmenting, by a processor, an image into a plurality of windows;

estimating, by the processor, distance to a subject in each of the plurality of windows, based on depth pixels of the image in the window;

filtering, by the processor, the plurality of windows to reject windows outside of a desired window size range thereby defining a target set of windows, the desired window size range based on the estimated subject distance and on a focal length of the depth camera;

generating, by the processor, classifier features for each of the windows in the target set;

creating, by the processor, candidate windows through execution of a cascade classifier, the cascade classifier to perform preliminary detection of a human in each of the windows in the target set, based on the generated features;

merging, by the processor, neighboring candidate windows; and executing, by the processor, a linear classifier on the merged candidate windows to verify the detection of a human.

2. The method of claim 1, further comprising one or both of:

validating the depth pixels used in the distance estimation; and precomputing a plurality of desired window size ranges for each of a plurality of allowable subject distances.

3. The method of claim 1, wherein the classifier features comprise one or more of: luminance, hue, saturation, gradient, gradient orientation, and depth values, and wherein the cascade classifier is one of a Haar classifier, a Local Binary Pattern (LBP) classifier, a Histogram of Oriented Gradients (HOG) classifier, or a Speeded-Up Robust Features (SURF) classifier.

4. The method of claim 1, further comprising:
training the cascade classifier using adaptive boosting;
selecting regions adjacent to at least one of the merged candidate windows;
calculating a difference between the average of the values of the depth pixels in the adjacent regions and the average of the values of the depth pixels of the merged candidate window; and
providing the difference to the linear classifier as an additional feature associated with context of the merged candidate window.

5. A system for detection of humans in images generated by a depth camera, the system comprising:
a window generation circuit to segment an image into a plurality of windows;
a window filtering circuit to:
estimate distance to a subject in each of the plurality of windows, based on depth pixels of the image in the window; and
filter the plurality of windows to reject windows outside of a desired window size range thereby defining a target set of windows, the desired window size range based on the estimated subject distance and on a focal length of the depth camera;
a candidate detection circuit to:
generate classifier features for each of the windows in the target set; and
create candidate windows through execution of a cascade classifier, the cascade classifier to perform preliminary detection of a human in each of the windows in the target set, based on the generated features;
a candidate merging circuit to merge neighboring candidate windows; and
a candidate verification circuit to execute a linear classifier on the merged candidate windows to verify the detection of a human.

6. The system of claim 5, wherein the windows are square and vary through a range of sizes and positions within the image.

7. The system of claim , wherein the window filtering circuit further comprises a depth pixel validation circuit to validate the depth pixels used in the distance estimation.

8. The system of claim 5, wherein the window filtering circuit further comprises an image size range calculation circuit to precompute a plurality of desired window size ranges for each of a plurality of allowable subject distances.

9. The system of claim 5, wherein the classifier features comprise one or more of: luminance, hue, saturation, gradient, gradient orientation, and depth values.

10. The system of claim 5, wherein the cascade classifier is one of a Haar classifier, a Local Binary Pattern (LBP) classifier, a Histogram of Oriented Gradients (HOG) classifier, or a Speeded-Up Robust Features (SURF) classifier.

11. The system of claim 5, wherein the candidate detection circuit further comprises an adaptive boosting feature selection circuit to train the cascade classifier using adaptive boosting.

12. The system of claim 5, wherein the candidate verification circuit further comprises:
an adjacent region selection circuit to select regions adjacent to at least one of the merged candidate windows;
a difference averaging circuit to calculate a difference between the average of the values of the depth pixels in the adjacent regions and the average of the values of the depth pixels of the merged candidate window; and to provide the difference to the linear classifier as an additional feature associated with context of the merged candidate window.

13. At least one non-transitory computer readable storage medium having instructions encoded thereon that, when executed by one or more processors, result in the following operations for detection of humans in images generated by a depth camera, the operations comprising:
segmenting an image into a plurality of windows;
estimating distance to a subject in each of the plurality of windows, based on depth pixels of the image in the window;
filtering the plurality of windows to reject windows outside of a desired window size range thereby defining a target set of windows, the desired window size range based on the estimated subject distance and on a focal length of the depth camera;
generating classifier features for each of the windows in the target set;
creating candidate windows through execution of a cascade classifier, the cascade classifier to perform preliminary detection of a human in each of the windows in the target set, based on the generated features;
merging neighboring candidate windows; and
executing a linear classifier on the merged candidate windows to verify the detection of a human.

14. The computer readable storage medium of claim 13, wherein the windows are square and vary through a range of sizes and positions within the image.

15. The computer readable storage medium of claim 13, the operations further comprising validating the depth pixels used in the distance estimation.

16. The computer readable storage medium of claim 13, the operations further comprising precomputing a plurality of desired window size ranges for each of a plurality of allowable subject distances.

17. The computer readable storage medium of claim 13, wherein the classifier features comprise one or more of: luminance, hue, saturation, gradient, gradient orientation, and depth values.

18. The computer readable storage medium of claim 13, wherein the cascade classifier is one of a Haar classifier, a Local Binary Pattern (LBP) classifier, a Histogram of Oriented Gradients (HOG) classifier, or a Speeded-Up Robust Features (SURF) classifier.

19. The computer readable storage medium of claim 13, the operations further comprising training the cascade classifier using adaptive boosting.

20. The computer readable storage medium of claim 13, the operations further comprising:
selecting regions adjacent to at least one of the merged candidate windows;
calculating a difference between the average of the values of the depth pixels in the adjacent regions and the average of the values of the depth pixels of the merged candidate window; and
providing the difference to the linear classifier as an additional feature associated with context of the merged candidate window.

* * * * *